United States Patent

Yoshimura et al.

Patent Number: 4,609,720
Date of Patent: Sep. 2, 1986

[54] WHOLLY AROMATIC POLYESTER

[75] Inventors: Tamotsu Yoshimura, Machida; Masahiko Nakamura, Tokyo, both of Japan

[73] Assignee: Mitsubishi Chemical Industries Limited, Tokyo, Japan

[21] Appl. No.: 683,517

[22] Filed: Dec. 19, 1984

[51] Int. Cl.⁴ .............................................. C08G 63/60
[52] U.S. Cl. .................................... 528/190; 528/125; 528/126; 528/128; 528/173; 528/176; 528/191; 528/193; 528/194; 528/271
[58] Field of Search .............. 528/125, 126, 128, 173, 528/176, 190, 191, 193, 194, 271

[56] References Cited

U.S. PATENT DOCUMENTS

| | | | |
|---|---|---|---|
| 3,991,013 | 11/1976 | Pletcher | 528/193 |
| 4,083,829 | 4/1978 | Calundann et al. | 528/190 |
| 4,118,372 | 10/1978 | Schaefgen | 528/193 |
| 4,153,779 | 5/1979 | Jackson, Jr. et al. | 528/193 |
| 4,238,600 | 12/1980 | Jackson, Jr. et al. | 528/193 |
| 4,242,496 | 12/1980 | Jackson, Jr. et al. | 528/193 |
| 4,287,332 | 9/1981 | Jackson, Jr. et al. | 528/193 |
| 4,347,349 | 8/1982 | Siemionko | 528/193 |
| 4,355,134 | 10/1982 | Charbonneau et al. | 525/193 |
| 4,360,658 | 11/1982 | Jackson, Jr. et al. | 528/193 |
| 4,370,466 | 1/1983 | Siemionko | 528/193 |
| 4,412,058 | 10/1983 | Siemionko | 528/194 |
| 4,447,593 | 5/1984 | Funakoshi et al. | 528/193 |

FOREIGN PATENT DOCUMENTS

| | | |
|---|---|---|
| 0072540 | 6/1983 | European Pat. Off. |
| 0095938 | 12/1983 | European Pat. Off. |
| 0120671 | 10/1984 | European Pat. Off. |

Primary Examiner—Lester L. Lee
Attorney, Agent, or Firm—Oblon, Fisher, Spivak, McClelland & Maier

[57] ABSTRACT

Disclosed herein is a wholly aromatic polyester comprising a structural unit represented by the formula (A):

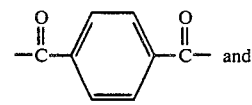

(i) a structural unit represented by the formulae (B), (C) and (D):

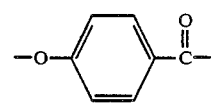

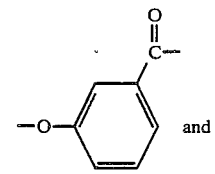

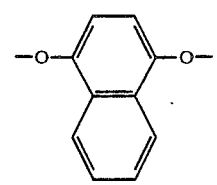

or (ii) a structural unit represented by the formulae (E), (F) and (G):

(Abstract continued on next page.)

wherein X represents a $C_1$ to $C_5$-hydrocarbon group, a halogen atom or an alkoxy group, and

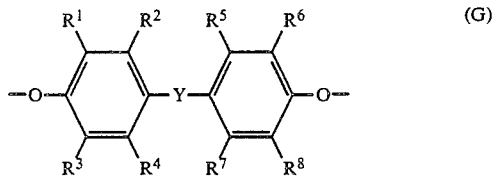

(G)

wherein Y represents an oxygen atom, a sulfur atom, a $SO_2$ group, a carbonyl group, an alkylene group or an alkylidene group, or a single bond directly connecting the two benzene rings and $R^1$, $R^2$, $R^3$, $R^4$, $R^5$, $R^6$, $R^7$ and $R^8$ represent respectively a hydrogen atom, a halogen atom or a hydrocarbon group, in the case of (i), the aromatic polyester containing 5 to 20 mol % of the unit (A), 35 to 65 mol % of the unit (B), 15 to 45 mol % of the unit (C) and 5 to 20 mol % of the unit (D), and the amount of the unit (A) and the amount of the unit (D) being substantially equimolar, in the case of (ii), the aromatic polyester containing the units (A), (E), (F) and (G), so that the sum of the amounts of the unit (A) and the unit (E) and the sum of the amounts of the unit (F) and the unit (G) are substantially equimolar, the ratio of the amount of the unit (A) to the amount of the unit (E) is from 95:5 to 5:95 and the ratio of the amount of the unit (F) to the amount of the unit (G) is from 65:35 to 100:0, and the aromatic polyester showing a logarithmic viscosity of at least 0.4 dl/g (determined as a solution of the aromatic polyester dissolved in a mixed solvent of tetrachloroethane and phenol (1:1 by weight) at a concentration of 0.5% by weight).

2 Claims, 2 Drawing Figures

WHOLLY AROMATIC POLYESTER

BACKGROUND OF THE INVENTION

The present invention relates to a novel, wholly aromatic polyester which can be subjected to melt-polymerization and to melt-molding and is excellent in mechanical properties.

Recently, the demand for the material excellent in rigidity, heat-resistance and resistance to chemicals and usable for preparing anything such as fibers, films and molded articles has been raised. Although polyesters are broadly recognized as the material for preparing the general molded articles, polyesters have not been suitable for the use requiring a high strength, because of poor mechanical properties such as flexural modulus. In order to improve the mechanical properties of polyesters, a method for blending a reinforcing agent such as calcium carbonate, glass fibers, etc. with a polyester has been known. However, after having been blended, the density of the thus blended material becomes too large to reduce the merit of the plastic material, that is, the lightness in weight, and further, in the time of molding, the abrasion, etc. of the molding machine is very severe thereby causing the practical problems.

As a polyester which does not need any reinforcing agent and is suitable for use in applications requiring a high strength, liquid crystalline polyesters have been attracted attention in recent years. Since the time when W. J. Jackson published a thermally liquid crystalline high polymer comprising polyethylene terephthalate and hydroxybenzoic acid in "Journal of Polymer Science", Chemistry Edition, Vol. 14, page 2043 (1976), such a specified polyester has been attracted one's attention particularly. In his publication, Jackson reported that the liquid crystalline high polymer exhibited a rigidity of more than 5 times, a strength of more than 4 times and an impact strength of more than 25 times that of polyethylene terephthalate, thereby demonstrating the possibility of obtaining a resin of high performance characteristics. Then, the development of liquid crystalline polyester have been continuously conducted while aiming at the coexistence of the improvement of strength and rigidity and the melt-moldability as seen in Japanese Patent Applications Laying-Open No. 53-65421, No. 54-50594, No. 55-21491, No. 55-50022 and No. 55-106220. However, in spite of the proposals of more than 100 kinds of liquid crystalline polyester, no successful polyester as the material for molded articles is offered. This is due to the high orientability of the polymer in a molten state thereof resulting in a high anisotropy of the mechanical properties.

The present inventors, as a result of their studies for reducing the anisotropy of the mechanical properties of the liquid crystalline polyester, have attained the present invention.

BRIEF EXPLANATION OF DRAWING

Of the attached drawing, FIGS. 1 and 2 respectively show an infrared absorption spectrum of the polyester obtained in Examples 1 and 18.

SUMMARY OF THE INVENTION

Figure 1:
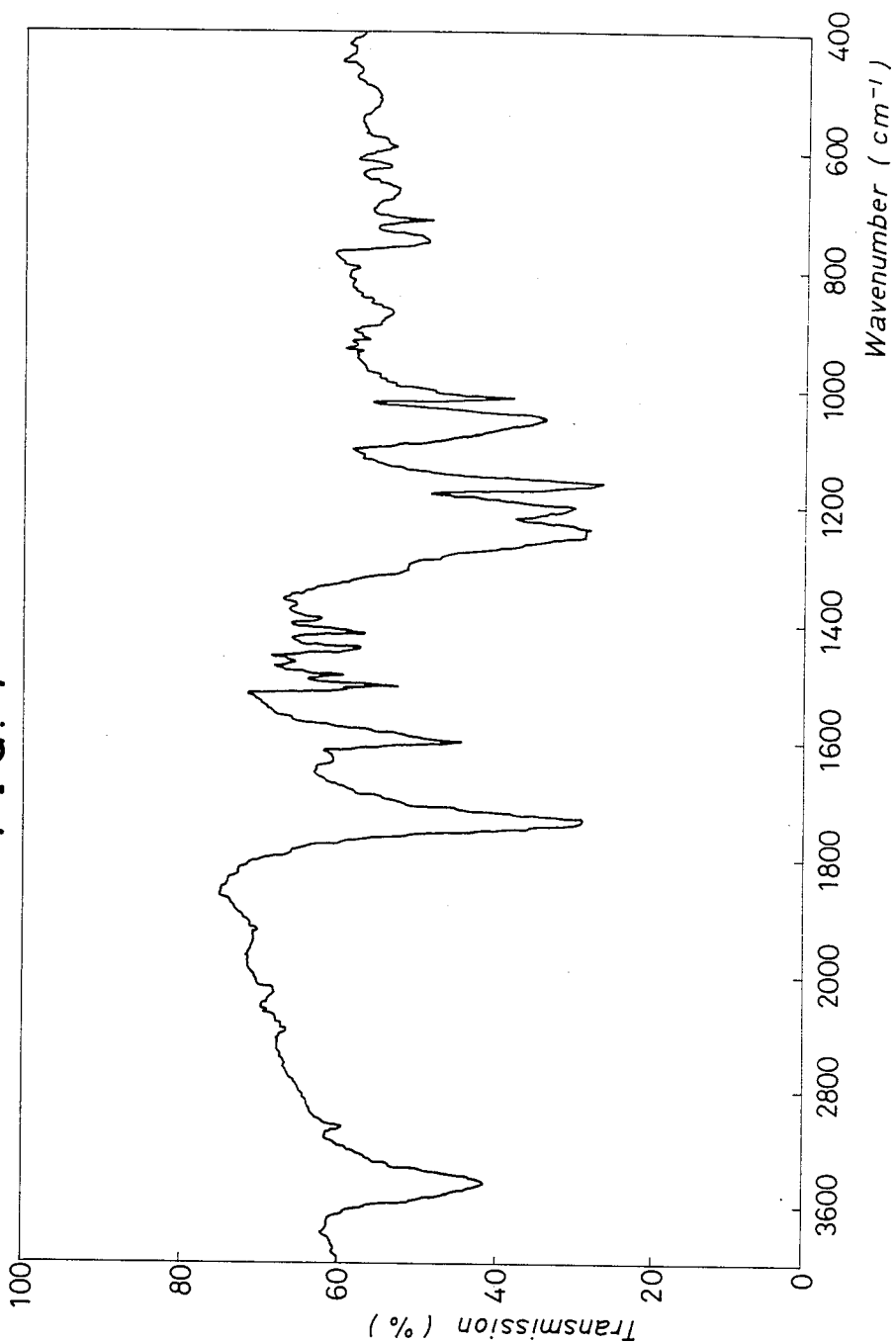

In an aspect of the present invention, there is provided a wholly aromatic polyester comprising a structural unit represented by the formula (A):

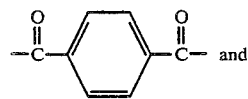

(i) a structural unit represented by the formulae (B), (C) and (D):

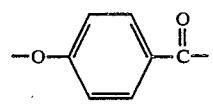

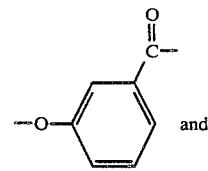

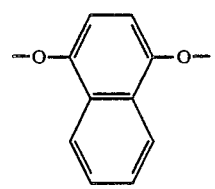

or (ii) a structural unit represented by the formulae (E), (F) and (G):

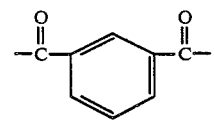

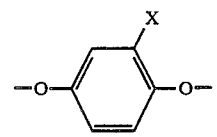

wherein X represents a $C_1$ to $C_5$-hydrocarbon group, a halogen atom or an alkoxy group, and

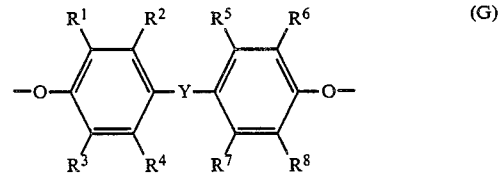

wherein Y represents an oxygen atom, a sulfur atom, a $SO_2$ group, a carbonyl group, an alkylene group or an alkylidene group, or a single bond directly connecting the two benzene rings and $R^1$, $R^2$, $R^3$, $R^4$, $R^5$, $R^6$, $R^7$ and $R^8$ represent respectively a hydrogen atom, a halogen atom or a hydrocarbon group, in the case of (i), the aromatic polyester containing 5 to 20 mol % of the unit (A), 35 to 65 mol % of the unit (B), 15 to 45 mol % of the unit (C) and 5 to 20 mol % of the unit (D), and the amount of the unit (A) and the amount of the unit (D) being the substantially equimolar, in the case of (ii), the aromatic polyester containing the units (A), (E), (F) and (G), so that the sum of the amounts of the unit (A) and the unit (E) and the sum of the amounts of the unit (F) and the unit (G) are substantially equimolar, the ratio of the amount of the unit (A) to the amount of the unit (E) is from 95:5 to 5:95 and the ratio of the amount of the unit (F) to the amount of the unit (G) is from 65:35 to 100:0, and the aromatic polyester showing a logarithmic viscosity of at least 0.4 dl/g (determined as a solution of the aromatic polyester dissolved in a mixed solvent of tetrachloroethane and phenol (1:1 by weight) at a concentration of 5% by weight).

DETAILED DESCRIPTION OF THE INVENTION

The wholly aromatic polyester according to the present invention has characteristics that the polyester shows liquid crystallinity in a molten state, is melt-moldable and is small in anisotropy of the physical properties when molded into shaped articles.

The wholly aromatic polyester according to the present invention comprises (i) the above-mentioned four structural units (A), (B), (C) and (D), or (ii) the above-mentioned four structural units (A), (E), (F) and (G).

(I) In the case of (i)

The structural unit (A) is a terephthaloyl group which is derived from terephthalic acid or a derivative thereof, for instance, an alkyl terephthalate. The structural unit (A) is present in the wholly aromatic polyester in an amount of 5 to 20 mol %, preferably 8 to 15 mol % thereof and in the substantially equimolar amount to that of the structural unit (D).

The structural unit (B) is

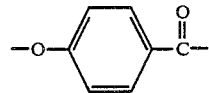

group which is derived from p-hydroxybenzoic acid or a derivative thereof, for instance, an alkyl p-hydroxybenzoate. The structural unit (B) is present in the wholly aromatic polyester in an amount of 35 to 65 mol %, preferably 45 to 55 mol % thereof.

The structural unit (C) is

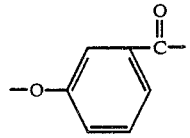

group which is derived from m-hydroxybenzoic acid or a derivative thereof, for instance, an alkyl m-hydroxybenzoate. The structural unit (C) is present in the wholly aromatic polyester in an amount of 15 to 45 mol %, preferably 25 to 35 mol % thereof.

The structural unit (D) is 1,4-naphthalenedioxy group which is derived from 1,4-naphthalendiol or a derivative thereof, for instance, a mono- or dialkylester thereof. The structural unit (D) is present in the wholly aromatic polyester in an amount of 5 to 20 mol %, preferably 8 to 15 mol % and in the substantially equimolar amount to that of the structural unit (A).

Since both the structural units (A) and (B) are para-substituted groups and form rigid structures, they exhibit an effect of improving the mechanical properties of the wholly aromatic polyester.

On the other hand, since both the structural units (C) and (D) have the molecular structure thereof which shows asymmetry to the main chain of the wholly aromatic polyester, they exhibit an effect of reducing the rigidity of the wholly aromatic polyester, which is exhibited by the structural units (A) and (B). In other words, the wholly aromatic polyester which has a liquid crystal temperature range in which the polyester is melt-moldable can be produced. In addition, particularly the m-hydroxy group of the structural unit (C) has an effect of bending the main chain of the polyester of the present invention into the direction of 60° from the straight chain thereof, the structural unit (C) has an effect of reducing the anisotropy of the physical properties of the molded articles made of the polyester of the present invention. Accordingly, by adjusting the ratio of the concentration of the structural units (C) and (D) to the concentration of the structural units (A) and (B) in the wholly aromatic polyester, it is able to obtain the wholly aromatic polyester which is melt-moldable and has a high mechanical properties and a low anisotropy in the physical properties.

Such a wholly aromatic polyester can be produced by, for instance, the melt-polymerization process. Namely, after mixing terephthalic acid, p-hydroxybenzoic acid, m-hydroxybenzoic acid and 1,4-naphthalenediol (or the respective derivatives thereof) and melting the resultant mixture, the molten mixture is polymerized by heating thereof at a temperature in a range of from 250° to 350° C. under ordinary pressure.

In order to promote the polymerization (to attain 100% polymerization), it is necessary to remove the by-products of polymerization such as acetic acid, acetic esters, etc. out from the reaction system. For that purpose, during the polymerization, at the time when the distillation of the byproducts under ordinary pressure comes to stop, the pressure of the reaction system is reduced to, for instance, lower than 1 mmHg and the polymerization is carried out while continuing the distillation of the by-product and then, at the time when the conversion becomes to nearly 100% and the degree of polymerization of the product has been sufficiently raised, the reaction is finished. In addition, these wholly aromatic polyesters have a merit of sufficiently producible even at the reaction temperature of from 250° to 300° C.

In addition, the above-mentioned polymerization can be, of course, carried out in an ordinary vessel for use in conventional polymerization and can be carried out in a kneader or an extruder.

(II) In the case (ii)

The structural unit (A) is the same as in (I), i.e., terephthaloyl group which is derived from terephthalic acid or a derivative thereof, for instance, an alkyl terephthalate and terephthaloyl chloride. The structural unit (E) is isophthaloyl group which is derived from isophthalic acid or a derivative thereof, for instance, an alkyl isophthalate and isophthaloyl chlorides. The structural unit (F) is a monosubstituted 1,4-phenylenedioxy group which is derived from a mono-substituted hydroquinone or a derivative thereof, for instance, a dialkyl ester thereof and a dialkaline metal salt thereof. The structural unit (G) has the structure shown in the formula (G) and has the same chemical reactivity as that of the structural unit (F) and accordingly, the structural unit (G) is derived from a dialkylester of a hydroquinone derivative and a dialkaline metal salt thereof.

The molar ratio of the amount of the structural unit (A) to that of the structural unit (E) is 95:5 to 5:95, and preferably 80:20 to 50:50 and the molar ratio of the amount of the structural unit (F) to that of the structural unit (G) is 65:35 to 100:0. Since the physical properties of the wholly aromatic polyester becomes poorer if the molar ratio of the amount of the structural unit (F) to that of the structural unit (G) becomes too small, such a molar ratio is not favorable.

In addition, the sum of the molar amounts of the structural units (A) and (E) is the same as the sum of the molar amounts of the structural units (F) and (G).

As the monomer usable as the source of the structural unit (F), methylhydroquinone, ethylhydroquinone, propylhydroquinone, methoxyhydroquinone, ethoxyhydroquinone, chlorohydroquinone, bromohydroquinone, phenoxyhydroquinone and the derivatives thereof may be mentioned. As the monomer usable as the source of the structural unit (G), 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis(4-hydroxydiphenyl)methane, bis(4-hydroxy-3,5-dimethylphenyl)methane, bis(4-hydroxy-3,5-dichlorophenyl)methane, bis(4-hydroxy-3,5-dibromophenyl)methane, 1,1-bis(4-hydroxyphenyl)cyclohexane, 4,4'-dihydroxydiphenyl-bis(4-hydroxyphenyl)ketone, bis(4-hydroxy-3,5-dimethylphenyl)ketone, bis(4-hydroxy-3,5-dichlorophenyl)ketone, bis(4-hydroxyphenyl)sulfide, bis(4-hydroxy-3-chlorophenyl)sulfide, bis(4-hydroxy-3,5-dichlorophenyl)sulfide, bis(4-hydroxyphenyl)sulfone, bis(4-hydroxy-3,5-dichlorophenyl)ether, 4,4'-dihydroxybiphenyl may be mentioned. These compounds may be used singly or used as a mixture thereof.

The structural units (A) and (F) are para-substituted groups and form rigid structures, they exhibit an effect of improving the mechanical properties of the wholly aromatic polyester. On the other hand, the structural units (E) and (F) have the molecular structure thereof which shows asymmetry to the main chain of the wholly aromatic polyester, they exhibit an effect of relaxing the rigity of the wholly aromatic polyester, which is exhibited by the structural units (A) and (D). Further, the structural unit (F) also has an effect of providing softness and heat-resistance to the molecule of the wholly aromatic polyester. Namely, by the use of the structural units (E) and (F), the wholly aromatic polyester which has a liquid crystal temperature range in which the polyester is melt-moldable can be produced.

In addition, particularly the isophthaloyl group of the structural unit (E) has an effect of bending the main chain into direction of 60° from the straight chain thereof and accordingly, the structural unit (E) has an effect of reducing the anisotropy of the physical properties of the molded articles made of the wholly aromatic polyester. Consequently, by adjusting the molar ratio of the amount of the structural unit (A) to that of the structural unit (E) in the polyester of the present invention, it is able to obtain the wholly aromatic polyester which is melt-moldable and has a high mechanical properties and a low anisotropy of the physical properties.

The above-mentioned wholly aromatic polyester shown in (II) can be produced by the known process of polymerization, for instance, the process of intersurface polymerization, solution polymerization and melt polymerization.

The wholly aromatic polyester according to the present invention shows a logarithmic viscosity of at least 0.4 dl/g. The logarithmic viscosity of a polymeric substance is the quotient obtained by dividing the value of natural logarithm of the relative viscosity of the solution of the polymeric substance in a solvent [in the present case, a mixed solvent of tetrachloroethane and phenol (1:1 by weight)] by the concentration of the polymeric substance in the solvent (in the present case, 0.5% by weight), and in the present invention, the logarithmic viscosity is determined in a solution of the wholly aromatic polyester dissolved in the mixed solvent of tetrachloroethane and phenol (1:1 by weight) at concentration of 0.5% by weight. The logarithmic viscosity of the wholly aromatic polyester of the present invention is preferably in the range of from 0.5 to 1.5 dl/g.

The judgement whether a polymeric substance is able to show anisotropy in a molten state or not is suitably carried out on the basis of an optical method by a polarization microscope. Namely, after placing a specimen on a heat stage attached to a polarization microscope, the image of the specimen is observed under the microscope while using a transmitted light through the specimen or a reflected light by the specimen and raising the temperature of the specimen slowly from the room temperature.

On observation, the solid polymer which does not show anisotropy suddenly changes to the isotropic molten state at the melting point of the polymer, and on the other hand, the solid polymer which show anisotropy changes from the crystalline state into a liquid crystalline state when the temperature passes over a certain temperature and thereafter, the thus liquefied polymer shows a stable liquid crystalline state within a relatively broad range of temperature and then, with the raise of temperature thereover, the liquid crystalline polymer changes to the isotropic molten state. The above-mentioned method is the most convenient and simple method for judging the anisotropy of a polymeric substance.

The wholly aromatic polyester according to the present invention can be melt-molded even at a temperature of lower than 300° C., and since the molded article shows a high rigidity (a high modulus of elasticity), it is useful as the material for small and accurate parts necessitating the thinner design, such as connectors, sockets and bobbins as the electronic parts.

The present invention will be explained more in detail while referring to the non-limitative examples shown below.

EXAMPLE 1 and COMPARATIVE EXAMPLES 1 to 3

In a tubular vessel for polymerization, provided with a stirrer, 16.6 g of terephthalic acid, 90.0 g of p-acetoxybenzoic acid, 54.0 g of m-acetoxybenzoic acid and 24.4 g of 1,4-naphthalenediol were introduced, and after purging the vessel 3 times with gaseous nitrogen, the vessel was immersed in an oil bath at 290° C., and the resultant mixture was stirred for one hour under a flow of gaseous nitrogen while distilling a large part of acetic acid by-produced during the stirring.

On reducing the inner pressure of the vessel to 0.5 Torr, the thus formed pre-polymeric substance solidified into blocks.

On taking out the solid blocks of the prepolymer (logarithmic viscosity: 0.75) from the vessel, pulverizing the prepolymer, introducing the thus pulverized prepolymer into a glass vessel for polymerization provided with a stirrer and subjecting the prepolymer to solid-phase polymerization for 8 hours under the conditions of the temperature of 100° C. and the pressure of 0.5 Torr while stirring, the completely polymerized substance was obtained in a yield of nearly 100%, however, a part of the product was insoluble in the ordinary solvent and measurement of the viscosity of such a fraction was impossible.

The elemental analytical data of the thus obtained polymer are as follows.

|  | C (%) | H (%) |
|---|---|---|
| Found: | 70.89 | 3.40 |
| Calculated*: | 71.02 | 3.39 |

(*On the basis that the ratio of composition was the same as the ratio of charge.)

The polymer showed an optical anisotropy in the temperature range from 260° C. to 350° C. (the upper temperature-limit for determination) in a molten state. The optical anisotropy was observed by a polarization microscope (made by NIPPON KOGAKU Co., Ltd., Model POH) provided with a heat stage (made by Zeiss Co.).

After preparing a strand-shaped article from the thus obtained polymer by using an extruder, the sonic modulus of the thus produced polymer was measured on the extruded strand-shaped article as the specimen following the method disclosed in ASTM F 89-68, the value being shown in Table 1 with the values of sonic moduli of other conventional polymers.

The value of sonic modulus was obtained by measuring the velocity of sound (v) transmitted through the strand-shaped article by using a Dynamic Modulus Tester ® (made by TOYO SEIKI Works, Co., Ltd., Model PPM-5R) and calculating from the formula of Laplace:

$$E = \rho v^2$$

wherein E is the sonic modulus; $\rho$ is the density of the specimen (as measured by density gradient tube) and v is the velocity of sound.

TABLE 1

| Example or Comparative Example | Specimen | Sonic modulus (GPa) |
|---|---|---|
| Example 1 | Polymer of Example 1 | 7.0 |
| Comparative Example 1 | nylon 6[1] | 2.8 |
| Comparative Example 2 | polyamide-imide[2] | 6.0 |
| Comparative Example 3 | p-hydroxybenzoyl copolymer[3] | 6.0 |

Notes:
[1] Novamid ® 1010-J (made by MITSUBISHI CHEMICAL INDUSTRIES LTD.)
[2] Torlon ® 4203 (made by MITSUBISHI CHEMICAL INDUSTRIES LTD.)
[3] Ekonol ® E2000 (made by SUMITOMO CHEMICAL COMPANY LTD.)

Infrared absorption chart of the polymer obtained in Example 1 is shown in FIG. 1.

EXAMPLES 2 TO 14

In the same manner as in Example 1 except for changing molar ratio of terephthalic acid, p-acetoxybenzoic acid, m-acetoxybenzoic acid and 1,4-naphthalenediol as shown in Table 2, 13 kinds of polymers were produced. Sonic modulus of each of the thus produced polymers is shown also in Table 2.

TABLE 2

| Example | Mol % 1,4-Naphtha-lenediol | Mol % Terephthalic acid | Mol % p-acetoxy-benzoic acid | Mol % m-acetoxy-benzoic acid | Sonic modulus (GPa) | logarithmic viscosity |
|---|---|---|---|---|---|---|
| 2 | 8 | 8 | 55 | 29 | 6.0 | 0.78 |
| 3 | 8 | 8 | 50 | 34 | 7.0 | 0.80 |
| 4 | 8 | 8 | 45 | 39 | 5.5 | 0.75 |
| 5 | 10 | 10 | 55 | 25 | 6.5 | 0.75 |
| 6 | 10 | 10 | 45 | 35 | 6.5 | 0.88 |
| 7 | 12 | 12 | 50 | 26 | 6.0 | 0.95 |
| 8 | 12 | 12 | 45 | 31 | 7.5 | 0.90 |
| 9 | 15 | 15 | 50 | 20 | 5.5 | 1.00 |
| 10 | 15 | 15 | 45 | 25 | 7.5 | 1.25 |
| 11 | 15 | 15 | 40 | 30 | 6.5 | 0.98 |
| 12 | 20 | 20 | 45 | 15 | 5.5 | 1.05 |
| 13 | 20 | 20 | 40 | 20 | 6.0 | 0.90 |
| 14 | 20 | 20 | 35 | 25 | 5.5 | 0.93 |

EXAMPLES 15 AND 16, AND COMPARATIVE EXAMPLE 4

Strand-shaped article was prepared from the polymer obtained in Example 1 by subjecting thereof to an extruder, and chips of 3 mm square were taken out of the strand-shaped article (5 mm in diameter), and the compression strength of the polymer was measured on the thus prepared chip as the specimen at a compression velocity of 1 mm/sec. The compression strength is the value obtained by dividing the maximum load necessary for 10% deformation of the initial thickness of the chip by the sectional area of the specimen (chip) (refer to ASTM D-1621). The number of specimen is 5 in the direction parallel to the strand, and 5 in the direction perpendicular to the strand. The test was carried out by using a Tensilon ® tester (made by TOYO Baldwin Co., Ltd.).

As Comparative Example 4, a representative liquid crystalline polyester (produced from 40 mol % of polyethylene terephthalate and 60 mol % of p-acetoxybenzoic acid by MITSUBISHI CHEMICAL INDUSTRIES LTD., showing an inherent viscosity[1] of 0.66) was subjected to the same test in measuring the compression strength thereof.

(1) The inherent viscosity was measured in the concentration of 1 g/dl [the solution of the polyester in a mixed solvent of tetrachloroethylene and phenol (1:1 by weight)] at 30° C.

The data of compression strength test are shown in Table 3.

TABLE 3

| Example or Comparative Example | Specimen | Compression strength MD* | TD** | Anisotropy (MD/TD) |
|---|---|---|---|---|
| | | Unit of compression strength: kg/cm² | | |
| Example 15 | Polymer of Example 1 | 310 | 220 | 1.4 |
| Comparative Example 4 | See above | 280 | 130 | 2.2 |

Notes
*: parallel to the strand extruded
**: perpendicular to the strand extruded Further, the polymer obtained in Example 1 and the polymer used in Comparative Example 4 were respectively subjected to an injection molding machine (made by NISSEI JUSHI Co., Ltd. Model AU-30) to prepare the plates of 80 mm in length, 80 mm in width and 3 mm in thickness at a temperature of the cylinder of 300° to 345° C. for the polymer obtained in Example 1 and 230° to 250° C. for the polymer used in Comparative Example 4. From each plate, strip-shaped specimens (MD) were cut out in the direction parallel to the flow of the polymer and strip-shaped specimens (TD) were cut out in the direction perpendicular to the flow of the polymer, and the bending modulus of elasticity and the bending strength thereof were measured by Tensilon ® tester (TOYO-Baldwin Co., Ltd.), the data being shown in Table 4.

TABLE 4

| Example or Comparative Example | Flexural Modulus (kg/cm²) MD | TD | MD/TD | Flexural Strength (kg/cm²) MD | TD | MD/TD |
|---|---|---|---|---|---|---|
| | | | | Unit of modulus and strength: kg/cm² | | |
| Example 16 | 73 × 10³ | 54 × 10³ | 1.4 | 750 | 510 | 1.5 |
| Comparative Example 5 | 62 × 10³ | 17 × 10³ | 3.6 | 850 | 440 | 2.0 |

EXAMPLE 17

In a desk-type kneader of a capacity of 1 liter, 49.8 g of terephthalic acid, 207.0 g of p-hydroxybenzoic acid, 124.2 g of m-hydroxybenzoic acid, 48.0 g of 1,4-naphthalenediol and 459.0 g of acetic anhydride were introduced, and the temperature of the kneader was elevated to 150° C. and the kneader was stirred for 1 hour, and then the temperature of the kneader was elevated to 280° C., thereby acetic acid and unreacted acetic anhydride were distilled from the kneader. After reducing the inner pressure of the kneader to 1 Torr, the content of the kneader was stirred for one hour to obtain a solid prepolymer showing a logarithmic viscosity of 0.65.

On reducing the temperature of the kneader to 100° C. and stirring thereof for 8 hours, solid polymerization proceeded to form powdery polymer. Thus, the polymer was obtained in a yield of nearly 100%. A part of the polymer was insoluble in the conventional solvents and the viscosity of such insoluble polymer could not measure.

EXAMPLE 18 AND COMPARATIVE EXAMPLES 6 TO 8

In 40 ml of pyridine, 52 mmol (9.89 g) of p-toluenesulfonic chloride and 40 mmol of dimethylformamide (2.92 g) were dissolved, the thus prepared solution being named as Solution (a).

In 32 ml of pyridine, 10 mmol (1.66 g) of isophthalic acid and 10 mmol (1.66 g) of terephthalic acid were dissolved, the thus prepared solution being named as Solution (b).

After adding Solution (a) to Solution (b), the mixture was sitrred at 120° C. for 10 min to obtain a transparent solution.

Into the transparent solution, a solution of 20 mmol (2.48 g) of methylhydroquinone in 40 ml of pyridine was added dropwise within 20 min, and the mixture was stirred for 3 hours at 120° C. under a flow of gaseous nitrogen to carry out the reaction. After the reaction was over, the reaction mixture was poured into methanol to precipitate the thus formed polymer. After collecting the polymer by filtration, the polymer was dried.

The yield of the polymerization was nearly 100%, and the polymer showed the logarithmic viscosity of 0.85 dl/g.

The elementary analytical data are as follows:

| | C (%) | H (%) |
|---|---|---|
| Found: | 71.01 | 3.92 |
| Calculated*: | 70.84 | 3.97 |

Figure 2:
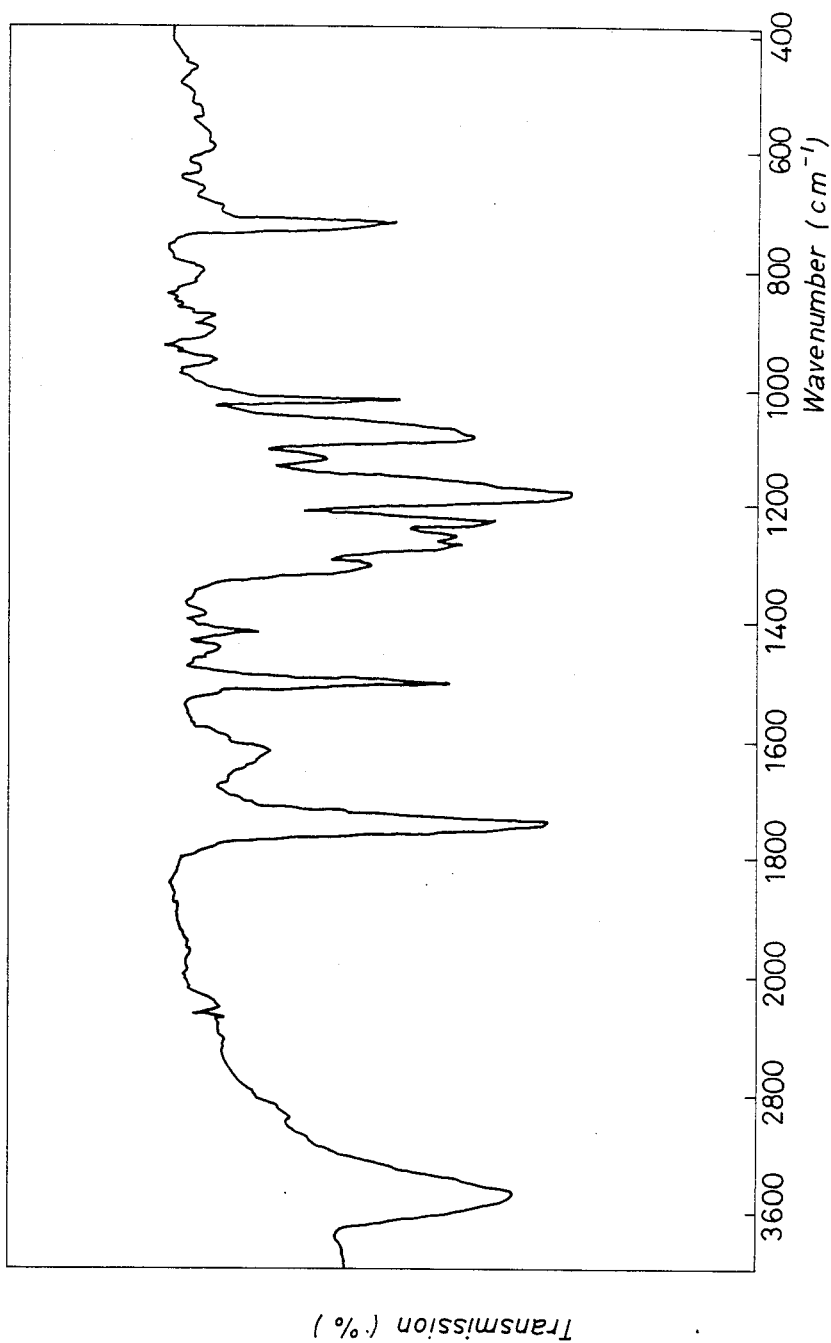

Note:
*on the basis that the composition ratio is the same as the ratio of the charge Infrared absorption spectral chart of the thus obtained polymer is shown in FIG. 2.

From these results, it is recognized that the thus produced polymer (polyester) has just the same composition as the charged ratios of each of the component as the starting material.

The polymer showed an optical anisotropy in a molten state in a temperature range of from 250° C. to 350° C. which is the upper limit of the measurement carried out by using a NICON ® polarization microscope (made by NIPPON KOGAKU Co., Ltd., Model POH) provided with a heat-stage (made by Zeiss Co.). The sonic modulus of the strand-like molded article made of the polymer by extruding from an extruder in the same method as in Example 1, and the value is shown together with the sonic moduli of other commercialized polymers in Table 5.

TABLE 5

| Example or Comparative Example | Specimen | Sonic modulus (GPa) |
|---|---|---|
| Example 18 | Polyester in Example 18 | 12.0 |
| Comparative Example 6 | Nylon 6 | 2.8 |
| Comparative Example 7 | Polyamide-imide | 6.0 |
| Comparative Example 8 | p-Hydroxybenzoyl copolymer | 6.0 |

EXAMPLES 19, 20, 22

In the same manner as in Example 18 except for changing the molar ratio of terephthalic acid and isophthalic acid as shown in Table 6, the polymers according to the present invention were produced. The monomeric ratio in the reaction and the logarithmic viscosity and the sonic modulus of each polymer are shown also in Table 6.

TABLE 6

| Example | Molar ratio of Iso[1] to Tere[2] | Logarithmic viscosity (dl/g) | Sonic modulus (GPa) |
|---|---|---|---|
| Example 19 | 40/60 | 0.76 | 9.0 |
| Example 20 | 60/40 | 1.00 | 11.5 |
| Example 21 | 30/70 | 0.59 | 4.5 |
| Example 22 | 70/30 | 0.97 | 4.5 |

Notes:
[1]Iso means isophthalic acid
[2]Tere means terephthalic acid

EXAMPLES 23 TO 26

In the same manner as in Example 18 except for changing the molar ratio of terephthalic acid, isophthalic acid, methylhydroquinone and 2,2-bis(4-hydroxyphenyl)propane (referred to as Bis-A hereinafter) shown in Table 7, the polymers were obtained, the logarithmic viscosity and the sonic modulus of each of the thus obtained polymers being shown also in Table 7.

TABLE 7

| Example | Molar ratio Iso[1]/Tere[2] | MH[3]/Bis-A | Logarithmic viscosity (dl/g) | Sonic modulus |
|---|---|---|---|---|
| Example 23 | 40/60 | 90/10 | 0.91 | 8.5 |
| Example 24 | 50/50 | 90/10 | 0.89 | 8.0 |
| Example 25 | 30/70 | 70/30 | 1.35 | 5.0 |
| Example 26 | 50/50 | 70/30 | 0.76 | 4.0 |

Notes:
[1]Iso means isophthalic acid
[2]Tere means terephthalic acid
[3]MH means methylhydroquinone

EXAMPLE 27 AND COMPARATIVE EXAMPLE 9

The polymer obtained in Example 18 was molded into plates to 80 mm in width, 80 mm in length and 3 mm in thickness by using an injection molding machine (NISSEI Resin Co., Ltd. Model AU-30) at a cylinder temperature of 300° to 345° C. As Comparative Example 13, a representative liquid crystalline polyester (made by MITSUBISHI CHEMICAL INDUSTRIES Ltd., showing an inherent viscosity of 0.66 made of 40 mol % of polyethylene terephthalate and 60 mol % of p-acetoxybenzoic acid) was also molded in the same manner except for using the cylinder temperature of 230° to 250° C.

Two kinds of strips were cut out from the thus prepared plates, (i) in the direction parallel to the flow of the resin (MD) and (ii) in the direction perpendicular to that (TD), and bending modulus of elasticity and bending strength of the strip were measured according to ASTM D-790 by subjecting the specimen to Tensilon ® tester (made by TOYO-Baldwin Co., Ltd.). The test data are shown in Table 8.

TABLE 8

| Example or Comparative Example | Flexural modulus | | MD/ TD | Flexural Strength | | MD/ TD |
|---|---|---|---|---|---|---|
| | M/D | T/D | | MD | TD | |
| Example 27 | 120 × 10³ | 86 × 10³ | 1.4 | 800 | 530 | 1.5 |
| Comparative Example 9 | 62 × 10³ | 17 × 10³ | 3.6 | 850 | 440 | 2.0 | unit: kg/cm²

EXAMPLE 28

In the same manner as in Example 18 except for changing the molar ratio of isophthalic acid to terephthalic acid to 60:40, using 14 mmol of methylhydroquinone and 6 mmol of 4,4'-dihydroxydiphenyl instead of 20 mmol of methylhydroquinone, a polymer of a logarithmic viscosity of 0.80 dl/g was produced. The polymer showed the sonic modulus of 7.0 GPa in the same manner as in Example 1.

EXAMPLE 29

In the same manner as in Example 18 except for using chlorohydroquinone instead of methylhydroquinone in Example 18, a polymer of a logarithmic viscosity of 1.10 dl/g and sonic modulus of 9.0 GPa was obtained.

What is claimed is:

1. A wholly aromatic polyester consisting essentially of structural units represented by formulas (A), (B), (C) and (D):

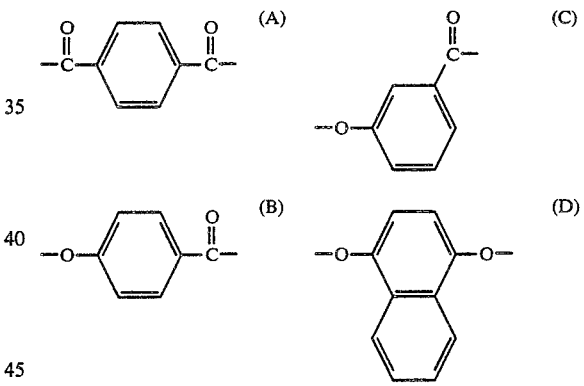

said aromatic polyester containing 5 to 20 mol % of the unit (A), 35 to 65 mol % of the unit (B), 15 to 45 mol % of the unit (C) and 5 to 20 mol % of the unit (D), and the amount of the unit (A) and the amount of the unit (D) being substantially equimolar, and said aromatic polyester showing a logarithmic viscosity of at least 0.4 dl/g (determined as a solution of the aromatic polyester dissolved in a mixed solvent of tetrachloroethane and phenol (1:1 by weight) at a concentration of 0.5% by weight).

2. The wholly aromatic polyester according to claim 1, wherein said aromatic polyester contains 8 to 15 mol % of the unit (A), 45 to 55 mol % of the unit (B), 25 to 35 mol % of the unit (C) and 8 to 15 mol % of the unit (D).

* * * * *